United States Patent
Yoshii et al.

(10) Patent No.: US 11,987,688 B2
(45) Date of Patent: May 21, 2024

(54) PHOTOCURABLE COMPOSITION, A HYDROGEL AND A MOLDED PRODUCT THEREOF

(71) Applicant: Shin-Etsu Chemical Co., Ltd., Tokyo (JP)

(72) Inventors: Ryosuke Yoshii, Annaka (JP); Kohei Masuda, Annaka (JP); Mamoru Hagiwara, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1107 days.

(21) Appl. No.: 16/644,860

(22) PCT Filed: Aug. 21, 2018

(86) PCT No.: PCT/JP2018/030785
§ 371 (c)(1),
(2) Date: Mar. 5, 2020

(87) PCT Pub. No.: WO2019/049651
PCT Pub. Date: Mar. 14, 2019

(65) Prior Publication Data
US 2021/0024719 A1 Jan. 28, 2021

(30) Foreign Application Priority Data
Sep. 7, 2017 (JP) .................. 2017-171959

(51) Int. Cl.
C08K 3/22 (2006.01)
C08F 292/00 (2006.01)
G02B 1/04 (2006.01)
G02B 27/00 (2006.01)
G02C 7/10 (2006.01)

(52) U.S. Cl.
CPC ............. *C08K 3/22* (2013.01); *C08F 292/00* (2013.01); *G02B 1/043* (2013.01); *G02B 27/0006* (2013.01); *C08K 2003/2231* (2013.01); *C08K 2003/2237* (2013.01); *C08K 2003/2262* (2013.01); *G02C 7/10* (2013.01)

(58) Field of Classification Search
CPC .. C08F 2/44; C08F 2/50; C08F 220/20; C08F 292/00; C08F 220/201; C08F 222/102; C08J 5/00; C08K 3/22; C08K 2003/2213; C08K 2003/2231; C08K 2003/2237; C08K 2003/2241; C08K 2003/2262; C08K 2003/2296; C08L 101/14; G02B 1/043; G02B 27/0006; G02C 7/04; G02C 7/10

See application file for complete search history.

(56) References Cited

U.S. PATENT DOCUMENTS

| | | | |
|---|---|---|---|
| 6,447,118 B1 * | 9/2002 | Okumura | C08L 33/00 351/159.33 |
| 2004/0155312 A1 * | 8/2004 | Muller-Lierheim | A61F 2/1613 257/449 |
| 2007/0154561 A1 * | 7/2007 | Takeda | C01G 23/053 424/489 |
| 2014/0023855 A1 * | 1/2014 | Masuda | C08J 7/043 252/588 |
| 2016/0108258 A1 | 4/2016 | Masuda | |

FOREIGN PATENT DOCUMENTS

| | | | | |
|---|---|---|---|---|
| EP | 188110 A | * | 7/1986 | ............ C08F 251/02 |
| JP | H02-135263 A | | 5/1990 | |
| JP | 3063041 B2 | | 3/1993 | |
| JP | 2000-296174 A | | 10/2000 | |
| JP | 2000-327925 B1 | | 11/2000 | |
| JP | 2004-530940 A1 | | 10/2004 | |
| JP | 2006-188386 A1 | | 7/2006 | |
| JP | 2009-029931 A1 | | 2/2009 | |
| JP | 5704133 B2 | | 2/2014 | |
| JP | 2016-79395 A | | 5/2016 | |

* cited by examiner

*Primary Examiner* — Sanza L. McClendon

(57) ABSTRACT

A photocurable composition including the following components (A) to (D), (A) a monomer having one (meth) acryloyl structure, (B) a crosslinking agent having two or more (meth)acryloyl structures, (C) an inorganic ultraviolet-blocking agent having a 50% volume cumulative particle size of 1 to 50 nm, and (D) a photopolymerization initiator in an amount of 0.05 to 1 part by weight, relative to total 100 parts by weight of components (A) and (B), wherein a part or all of component (A) is a hydrophilic monomer, and a content of the hydrophilic monomer is 70% by weight or more, relative to the total weight of components (A) and (B).

15 Claims, 2 Drawing Sheets

PHOTOCURABLE COMPOSITION, A HYDROGEL AND A MOLDED PRODUCT THEREOF

TECHNICAL FIELD

The present invention relates to a photocurable composition, a cured product of the composition, a hydrogel comprising the cured product, and a molded product thereof. Specifically, the present invention relates to a hydrogel having an ultraviolet shielding property.

BACKGROUND OF THE INVENTION

Hydrophilic resins are widely used for hydrogel molded articles for biological use, such as soft contact lenses.

Ultraviolet rays having wavelengths of 300 nm or less in sunlight are easily absorbed by a cornea and are considered to be one of causes for corneal damage. Ultraviolet rays having a wavelength longer than 300 nm also reach the eye lens and retina, and are also considered to be a cause of corneal damage. Therefore, it is extremely meaningful to provide the hydrophilic resin material with an ultraviolet shielding function.

Generally, the ultraviolet shielding function is provided to a resin by the incorporation of an ultraviolet absorber. UV absorbers, such as benzotriazole, benzophenone or triazine type one, are widely known (Patent Literature 1). On the other hand, hydrophilic resins are cured often by ultraviolet. The process of the ultraviolet curing is shorter than a heat curing process. When the organic ultraviolet absorber is used in the ultraviolet curing process, there are problems that discoloration or white turbidity occurs due to photo- or heat-decomposition of the organic ultraviolet absorbers.

Further, a part of the ultraviolet rays is absorbed by an ultraviolet absorber present in the composition in the ultraviolet curing, which may cause poor curing or delayed curing of the composition. Usually, in order to suppress the poor curing, the amount of ultraviolet exposure or the amount of ultraviolet polymerization initiator is increased. Then, another problem such as discoloration or decomposition of the composition is caused by a large amount of the ultraviolet exposure or an excessive amount of the initiator.

Metal oxides such as titanium oxide and zinc oxide are known as an ultraviolet shielding agent that does not easily cause photo- or heat-decomposition. However, these metal oxides have a photocatalytic activity to decompose a surrounding resin or organic material under irradiation with ultraviolet. Regarding this problem, for example, Patent Literatures 2 and 3 describe that a silicone coating composition containing tetragonal titanium oxide composite fine particles which is a solid solution containing tin and manganese has excellent weather resistance together with ultraviolet curability and transparency. However, application of such fine particles to a hydrogel for a biological use such as a soft contact lens is not referred to.

PRIOR ART LITERATURES

Patent Literatures

[Patent Literature 1] Japanese Patent No.3063041
[Patent Literature 2] Japanese Patent No.5704133
[Patent Literature 3] Japanese Patent Application Laid-Open No.2016-79395

SUMMARY OF THE INVENTION

Problems to be Solved by the Invention

One of the purposes of the present invention is to provide a hydrophilic resin composition having excellent ultraviolet curability and ultraviolet shielding ability, and a hydrogel comprising the composition and a molded article thereof.

Means to Solve the Problems

The present invention provides a photocurable composition comprising the following components (A) to (D),
(A) a monomer having one (meth)acryloyl structure,
(B) a crosslinking agent having two or more (meth)acryloyl structures in an amount of 0.1 to 10 parts by weight, relative to total 100 parts by weight of components (A) and (B),
(C) an inorganic ultraviolet-blocking agent having a 50% volume cumulative particle size of 1 to 50 nm in the particle size distribution as determined according to a dynamic light scattering method, in an amount of 0.5 to 10 parts by weight, relative to total 100 parts by weight of components (A) and (B), and
(D) a photopolymerization initiator in an amount of 0.05 to 1 part by weight, relative to total 100 parts by weight of components (A) and (B),
wherein a part or all of component (A) is a hydrophilic monomer, and a content of the hydrophilic monomer is 70% by weight or more, relative to the total weight of components (A) and (B).

Effects of the Invention

The photocurable composition of the present invention shows a good ultraviolet curing property with the small amount of the photopolymerization initiator and/or even with a small amount of light irradiation, and provides a hydrophilic cured product having excellent visible light transmittance and an ultraviolet shielding property. Furthermore, a hydrogel comprising the hydrophilic cured product and water functions well as a biological hydrogel to provide various molded articles such as ophthalmic devices such as intraocular lenses and contact lenses.

DETAILED DESCRIPTION OF THE INVENTION

Figure 1:
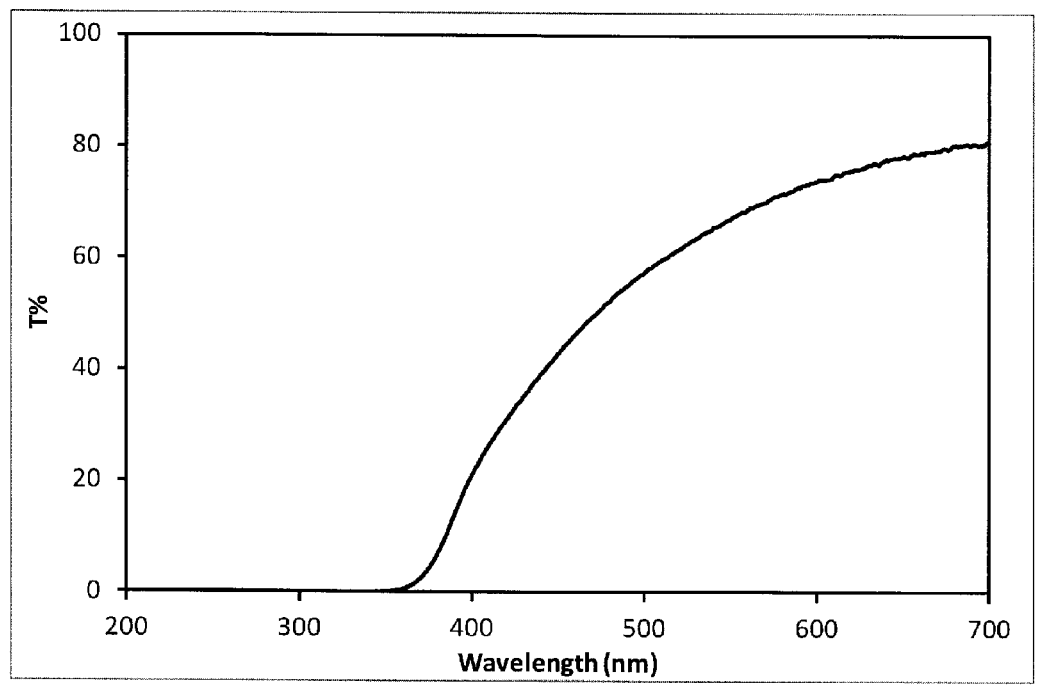
FIG. 1 is a transmitted UV and visible light spectrum of the hydrogel obtained in Example 1.

The term "monomer" in the present specification means a chemical compound having at least one polymerizable group and having a number average molecular weight of less than 2,000 daltons, as determined by refractive index detection in gel permeation chromatography (GPC) and reduced to polystyrene. Thus, the "monomer" includes an oligomer comprising one or more constituents.

(A) Monomer Having One (Meth)Acryloyl Structure

Component (A) in the present invention is a monomer having one acryloyl or methacryloyl structure in the molecule. The term "monomer" specifically indicates, as described above, a compound having a number average molecular weight of less than 2,000 daltons, and includes a monomer and an oligomer. Examples of a moiety having one (meth)acryloyl structure include an acryloyl group, a methacryloyl group, an acryloyloxy group, a methacryloyloxy group, an acrylamide group and a methacrylamide group.

Any (meth)acryloyl structure-containing compounds known as a monomer for preparing a hydrogel are used as component (A). Examples of such include acrylic monomers such as (meth)acrylic acid, methyl(meth)acrylate, ethyl (meth)acrylate, n-propyl(meth)acrylate, isopropyl(meth)acrylate, n-butyl(meth)acrylate, t-butyl(meth)acrylate, n-hexyl(meth)acrylate, cyclohexyl(meth)acrylate, n-octyl (meth)acrylate, phenyl(meth)acrylate, (poly)ethylene glycol dimethacrylate, polyalkylene glycol mono(meth)acrylate, polyalkylene glycol monoalkyl ether(meth)acrylate, trifluoroethyl(meth)acrylate, 2-hydroxyethyl(meth)acrylate and 2,3-dihydroxypropyl(meth)acrylate; and acrylic acid derivatives such as N,N-dimethylacrylamide, N,N-diethylacrylamide, N-acryloyl morpholine and N-methyl(meth)acrylamide, and silicone monomers having (meth)acryloyl structure. They may be used singly or in combination of two or more of them. The present composition includes at least one hydrophilic monomer as component (A).

The hydrophilic monomer is not particularly limited as long as it has one (meth)acryloyl structure and is water-soluble. For example, a (meth)acrylic acid derivative represented by the following formula (I) is preferable:

$$CH_2=CR^1COR^2 \quad (I)$$

wherein $R^1$ is a hydrogen atom or a methyl group, $R^2$ is a substituted or unsubstituted, linear, branched or cyclic alkyl group having 1 to 6 carbon atoms,  $—(OC_2H_4)_n(OC_3H_6)_mOCH$, $—OH$, $—OR^3$, $—NH^2$, $—NHR^3$, or $—NR^3R^4$, wherein n and m are 0 or a positive integer and n+m is an integer of 1 to 100, the repeating units in parentheses with subscript n or m may be at random or blocked, and $R^3$ and $R^4$ are independently of each other, substituted or unsubstituted linear, branched or cyclic alkyl groups having 1 to 6 carbon atoms.

For $R^2$, $R^3$ and $R^4$, the substituted or unsubstituted, linear, branched or cyclic alkyl group having 1 to 6 carbon atoms is preferably a linear alkyl group having 1 to 4 carbon atoms. A part or all of the hydrogen atoms in the alkyl group may be substituted with another substituent. Examples of the substituent include a halogen atom such as fluorine, chlorine or bromine atom; and a reactive group such as a glycidoxy group, an amino group, a mercapto group, and a hydroxy group.

Examples of the more preferable hydrophilic monomer include N,N-dimethylacrylamide (DMA), 2-hydroxyethylmethacrylate (HEMA), glycerol monomethacrylate, 2-hydroxyethylmethacrylamide, polyethylene glycol monomethacrylate, methacrylic acid and acrylic acid. They may be used singly or in combination of two or more of them. HEMA is preferable.

In the composition of the present invention, the amount of the hydrophilic monomer is 70% by weight or more, preferably 80% by weight or more, more preferably 90% by weight or more, based on the total weight of components (A) and (B). If the amount of the hydrophilic monomer is less than 70% by weight, it is difficult to produce a hydrogel. Component (A) may optionally include a (meth)acryloyl structure-having compound other than the hydrophilic monomer described above. The amount of the optional (meth)acryloyl structure-having compounds is preferably 0.1 to 29.9% by weight, based on the total weight of components (A) and (B).

<(B) Crosslinking Agent Having Two or More (Meth) Acryloyl Structures>

Component (B) in the present invention is a chemical compound having two or more (meth)acryloyl structures. Component (B) may be either a hydrophilic crosslinking agent or a hydrophobic crosslinking agent, or a mixture thereof. Examples of the hydrophilic crosslinking agent include tetraethylene glycol dimethacrylate (TEGDMA), triethylene glycol dimethacrylate (TrEGDMA), ethylene glycol dimethacrylate (EGDMA), ethylenediamine dimethacrylamide and glycerol dimethacrylate. Examples of hydrophobic crosslinking agents include polydimethylsiloxane having an acryloxypropyl terminal (acPDMS), hydroxyacrylate modified siloxane, PDMS having a methacryloxypropyl terminal, butanediol dimethacrylate, divinylbenzene and 1,3-bis(3-methacryloxypropyl)tetrakis(trimethylsiloxy) disiloxane. They may be used singly or in combination of two or more of them.

TEGDMA, EGDMA, acPDMS and the combination thereof are preferred.

The amount of component (B) in the photocurable composition of the present invention is 0.1 to 10% by weight, preferably 0.3 to 5% by weight, more preferably 0.5 to 2% by weight, based on the total weight of components (A) and (B). If the amount of component (B) is less than the afore-mentioned lower limit, the crosslinking between the molecules necessary for forming the hydrogel is insufficient. If the amount is larger than the afore-mentioned upper limit, the crosslinking density in the gel is too much so that water absorption and flexibility of the hydrogel are poor, and it is difficult to use the hydrogel in biological applications.

<(C) Inorganic Ultraviolet Shielding Agent>

The inorganic ultraviolet shielding agent (C) in the present invention is a metal oxide particle having an ultraviolet absorbing ability or an ultraviolet scattering ability. The metal oxide may be such usually blended in sunscreen cosmetics, for instance, titanium oxide, zinc oxide and cerium oxide. The inorganic ultraviolet shielding agent in the present invention may be composited with another metal oxide such as silicon oxide, aluminum oxide and zirconium oxide or metal such as tin, manganese and cobalt via chemical bonds.

The inorganic ultraviolet shielding agent has a 50% cumulative particle size of 1 to 50 nm, preferably 1 to 40 nm, more preferably 1 to 30 nm, and particularly preferably 1 to 20 nm, in a particle size distribution on a volume basis as determined according to the dynamic light scattering method. If the average cumulative particle size of the inorganic ultraviolet shielding agent is larger than the afore-mentioned upper limit, light scattering is remarkable so that transparency of the cured product may be impaired. If the average cumulative particle size is less than the lower limit, a total surface area of the inorganic ultraviolet shielding agent in the composition is extremely large so that aggregation of the particles occurs and handling is difficult.

The amount of the inorganic ultraviolet shielding agent is 0.5 to 10 parts by weight, preferably 2 to 8 parts by weight, and more preferably 3 to 6 parts by weight, relative to the total 100 parts by weight of components (A) and (B). If the amount is larger than the aforesaid upper limit, the curing property may be worse or the transparency of the cured product may be poor. If the amount is smaller than the aforesaid lower limit, the ultraviolet absorption property may be insufficient.

A particle size (average cumulative particle size) of the inorganic ultraviolet shielding agent may be determined by various methods. The particle size in the present invention is a 50% volume cumulative particle size ($D_{50}$) in the particle size distribution, as determined by a dynamic light scattering method using a laser beam. Electron microscopy may also be used for supporting evidence. The sizes determined by these methods do not vary, dependent on measuring devices. For example, Nanotrack UPA-EX150 (ex Nikkiso Co., Ltd.) may be used for the dynamic light scattering method. For the electronic microscopy, Transmission Electron Microscope H-9500 (ex Hitachi High-Technologies, Ltd.) may be used.

The inorganic ultraviolet shielding agent in the present invention is preferably a core-shell type particle having a core composed of a titanium oxide-containing metal oxide and having a silicon oxide shell outside the core. The core-shell structure improves dispersibility in the resin composition and suppresses degradation of the resin due to photocatalytic activity of titanium oxide.

The titanium oxide-containing metal oxide is preferably tetragonal titanium oxide particle which is a solid solution with at least one of tin and manganese. On account of the solid solution with at least one of tin and manganese, the photocatalytic activity of titanium oxide may be suppressed so as to decrease the degradation of the resin.

The titanium oxide-containing metal oxide may be further composited with metals other than tin and manganese, by simple mixing or chemical bond.

Titanium oxide may generally be of three types, i.e., rutile type, anatase type, and brookite type. In the present invention, tetragonal rutile type titanium oxide is preferred as a solid solvent from the viewpoint of low photocatalytic activity and excellent ultraviolet absorption capacity.

The tin component may be derived from a tin salt, and includes tin chalcogenides such as tin oxide and tin sulfide, and is preferably tin oxide. Examples of the tin salt include tin halides such as tin fluoride, tin chloride, tin bromide and tin iodide; a tin pseudo-halide such as tin cyanide and tin isothiocyanide; a tin mineral salt such as tin nitrate, tin sulfate and tin phosphate. Tin chloride is preferred for stability and availability. Tin in the tin salt may be selected from divalent to tetravalent ones, preferably tetravalent tin.

The manganese component may be derived from a manganese salt such as manganese chalcogenides such as manganese oxide and manganese sulfide, and manganese oxide is preferred. Examples of the manganese salt include manganese halides such as manganese fluoride, manganese chloride, manganese bromide and manganese iodide; manganese pseudo-halides such as manganese cyanide and manganese isothiocyanate; manganese mineral acid salts such as manganese nitrate, manganese sulfate and manganese phosphate. Manganese chloride is preferred for stability and availability. Manganese in the manganese salt may be selected from divalent to heptavalent ones, preferably divalent manganese.

The amount of the tin solid-solved in the tetragonal titanium oxide is such that a molar ratio of titanium to tin, Ti/Sn, is preferably 10 to 1,000, more preferably 20 to 200. The amount of the manganese solid-solved in the tetragonal titanium oxide is such that a molar ratio of titanium to manganese, Ti/Mn, is preferably 10 to 1,000, more preferably 20 to 200. If these ratios are smaller than the afore-mentioned lower limits, optical absorption by tin or manganese in the visible-region is remarkable. If the ratios exceed the afore-mentioned upper limits, the photocatalytic activity by titanium oxide is not sufficiently deactivated, and the crystal may be sometime of an anatase type which has a small ultraviolet absorbing ability.

The solid solution of tin or manganese with titanium oxide may be of a substitution type or invasion type. The substitution type means that titanium (IV) ion of titanium oxide is substituted by tin and manganese. The invasion type means that tin and manganese exist between the crystal lattices of titanium oxide. In the invasion type, the F center which causes discoloration is easily formed, and the Flank-Condon factor of the vibrational transition in the metal ions is also increased because the symmetry around the metal ions is poor, so that visible light is easily absorbed. Therefore, a substitution type is preferable.

The shell formed on the outer side of the core of the tetragonal titanium oxide fine particle which is the solid solution with tin and manganese is composed mainly of silicon oxide and may contain other components such as tin and aluminum, and is formed according to any known surface treatment method. For example, it may be formed by hydrolytic condensation of tetraalkoxysilanes such as tetramethoxysilane, tetraethoxysilane, tetra(n-propoxy)silane, tetra(i-propoxy)silane and tetra(n-butoxy)silane, all of which are usually available. Tetraethoxysilane is preferable from the viewpoints of reactivity and safety, such as, commercially available "KBE-04" (ex Shin-Etsu Chemical Co., Ltd.). The hydrolytic condensation of tetraalkoxysilane may be carried out in water, and a condensation catalyst such as ammonia, aluminum salts, organoaluminum, tin salts and organotin may be appropriately used, and ammonia is particularly preferable because it functions also as a dispersant for the fine core particles.

A ratio of silicon oxide to the entire core-shell particle composed of the solid solution core and the silicon oxide shell is 20 to 50% by weight, preferably 25 to 45% by weight, more preferably 30 to 40% by weight. If the amount of silicon oxide is less than 20% by weight, shell formation may be insufficient. If the amount of silicon oxide is larger than 50% by weight, agglomeration of the particles is promoted and the dispersion is non-transparent.

The inorganic ultraviolet shielding agent may be incorporated in a form of a dispersion in the photocurable composition of the present invention. In this case, after the incorporation of the dispersion, a dispersion medium may be distilled off at a reduced pressure. The amount of the dispersion may be such that the amount of the inorganic ultraviolet shielding agent satisfies the afore-mentioned range. Examples of the dispersion medium in which the inorganic ultraviolet shielding agent is dispersed includes monohydric or polyhydric alcohols such as methanol, ethanol, 1-propanol, 2-propanol, cyclopentanol, ethylene glycol, propylene glycol, β-thiaziglycol, butylene glycol and glycerin; ethers such as diethyl ether, dipropyl ether, cyclopentyl methyl ether, ethylene glycol dimethyl ether, diethylene glycol dimethyl ether, triethylene glycol dimethyl ether, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, butylene glycol monomethyl ether, butylene glycol monoethyl ether, butylene glycol monopropyl ether, and butylene glycol monobutyl ether; ketones such as acetone, diacetone alcohol, diethyl ketone, methyl ethyl ketone, methyl isobutyl ketone, methyl normal butyl ketone, dibutyl ketone, cyclopentanone, cyclohexanone, cycloheptanone and cyclooctanone; amides such as dimethylformamide, dimethylacetamide, tetraacetylethylenediamide, tetraacetylhexamethylenetetramide and N,N-dimethylhexamethylenediamine diacetate. Among these, ethanol is preferred.

A concentration of the inorganic ultraviolet shielding agent in the dispersion is preferably in the range of 1% by mass or more and 30% by mass or less, more preferably 5% by mass or more and 25% by mass or less, more preferably 10% by mass or more and 20% by mass or less. If the amount of the dispersoid is less than the aforesaid lower limit, it may be difficult to incorporate a sufficient amount of the agent in the photocurable composition. If the amount of the dispersoid exceeds the aforesaid upper limit, the storage stability of the organosol may be insufficient.

The metal oxide particles in the present invention preferably have a coating layer composed of a surface treatment agent on at least a part of the surface thereof. Examples of the surface treatment agent include compounds represented by the following general formula (II), hydrolysis condensation products thereof, and both. The surface treatment improves the dispersibility of the metal oxide particles in the dispersion medium and in the resin so as to suppress white turbidity due to agglomeration of the particles.

$$R^5Si(OR^6)_3 \qquad (II)$$

wherein $R^5$ is an unsubstituted or substituted monovalent hydrocarbon group having 1 to 15 carbon atoms, and $R^6$ is an alkyl group having 1 to 4 carbon atoms.

In the formula (II), $R^5$ is an unsubstituted or substituted monovalent hydrocarbon group having 1 to 15 carbon atoms, preferably 1 to 8 carbon atoms, such as, for example, alkyl groups such as a methyl, ethyl, n-propyl, isopropyl, n-butyl, n-pentyl, n-hexyl, n-heptyl, n-octyl, or n-decyl group; cycloalkyl group, such as a cyclopentyl or cyclohexyl group; alkenyl groups such as a vinyl group or an allyl group; aryl groups such as a phenyl group; halogen-substituted hydrocarbon groups such as a chloromethyl, γ-chloropropyl, 3,3,3-trifluoropropyl or perfluorooctylethyl group; and hydrocarbon groups substituted with a (meth)acryloyloxy, epoxy, mercapto, amino or isocyanate group, such as γ-acryloyloxypropyl, γ-methacryloyloxypropyl, γ-glycidoxypropyl, 3,4-epoxycyclohexylethyl, γ-mercaptopropyl, γ-aminopropyl, N-(2-aminoethyl)aminopropyl and γ-isocyanatopropyl groups. Among these, a methyl group, a vinyl group, a γ-acryloyloxypropyl group and a γ-methacryloyloxypropyl group are especially preferred.

In the formula (II), $R^6$ is an alkyl group having 1 to 4 carbon atoms, such as a methyl group, an ethyl group, an n-propyl group, an isopropyl group, an n-butyl group and a t-butyl group. Among these, a methyl group and an ethyl group are particularly preferable.

The organosilyl groups on the particle surface are confirmed by a signal characteristic of the organosilyl group in an IR spectrum or a solid NMR spectrum. The amount of the introduced organosilyl group is estimated by a difference between the weight of the titanium oxide particles before the introduction of the organosilyl group and the weight of the surface-treated particles having the organosilyl group. The amount of the introduced organosilyl group is preferably 2% by weight or more, based on the weight of the whole surface-treated fine particles, from the viewpoint of imparting dispersibility in the dispersion medium and in the resin.

<(D) Photopolymerization Initiator>

Any known photopolymerization initiator is used, such as various aromatic α-hydroxy ketones, alkoxyoxybenzoines, acetophenones, acylphosphine oxides, diketones, and mixtures thereof. Commercially available ones include Dalocure 1173 and Dalocure 2959 (ex BASF).

The amount of the photopolymerization initiator is 0.05 to 1 part by weight, preferably from 0.05 to 0.5 part by weight, more preferably from 0.05 to 0.1 part by weight, relative to the total 100 parts by weight of components (A) and (B).

Photo-curing may be carried out by heat radiation, ionizing radiation or actinic radiation, such as electron beam, X-ray, ultraviolet or visible light, i.e. electromagnetic or particle radiation which has wavelengths in the range of 150 to 800 nm, depending on the photopolymerization initiator to be used. In particular, ultraviolet light of 250 to 400 nm is desirable from the viewpoint of curability and handling. Appropriate sources of radiation are DV bulbs, fluorescent bulbs, incandescent light bulbs, mercury vapor bulbs and sunlight. In order to suppress yellow discoloration or white turbidity caused by the decomposition of a component of the composition, it is preferable that the amount of UV light exposure is small. The amount of UV light exposure is preferably 30 J/cm$^2$ or less, and more preferably 15 J/cm$^2$ or less.

The present photocurable composition may contain further additives in addition to the afore-mentioned components, as long as the effects of the present invention are not impaired. For instance, antimicrobial compounds, pigments, photochromic substances and release agents may be added.

The present photocurable composition is characterized in that it may provide a cured product having high ultraviolet light absorption and transparency. Light transmittance of the cured product in the ultraviolet-visible light region may be an index for the high ultraviolet light absorption and transparency. Because the light transmittance decreases generally as a film thickness increases, the film thickness is here fixed at 0.5 mm or less. It is preferable that the light transmittance at a wavelength of 600 nm is 70% or more, the light transmittance at a wavelength of 350 nm is 50% or less, and the light transmittance at a wavelength of 300 nm is 10% or less, all in a cured product having a film thickness of 0.5 mm or less. It is more preferable that the light transmittance at a wavelength of 600 nm is 80% or more, the light transmittance at a wavelength of 350 nm is 10% or less, and the light transmittance at a wavelength of 300 nm is 1% or less. If the light transmittance at a wavelength of 600 nm is less than 70%, discoloration or white turbidity may occur conspicuously so as to impair transparency, which is not preferable. If the light transmittance at a wavelength of 350 nm is larger than 50% and the light transmittance at a wavelength of 300 nm is larger than 10%, the ultraviolet absorption is poor and, therefore, any trouble may be caused by ultraviolet, which is not preferable. In this specification, the light transmittance of the cured coating may be suitably determined by a device to obtain UV and visible light absorption spectrum, such as, a spectrophotometer (U-3900H: ex Hitachi High-Technology Science Co., Ltd.).

The cured product obtained by curing the present photocurable composition has hydrophilicity. The cured product is preferably washed with a solvent in order to remove any dispersion medium, unreacted components and byproducts. Extraction may be done with an organic solvent such as ethanol, methanol, isopropanol, tripropylene glycol methyl ether (TPM), dipropylene glycol monomethyl ether (DPM), polyethylene glycol, polypropylene glycol, glycerol and a mixture thereof, or water, depending on the solubility of the cured product. The extraction solvent preferably contains 90% or more of water, and more preferably 97% or more of water. The extraction solvent may contain other additive salts such as sodium chloride and sodium borate. The process with the extraction solvent is preferably carried out for 3 minutes to 3 days, preferably 5 minutes to 60 minutes.

The cured product of the present invention is hydrated to provide a hydrogel. The amount of water contained in the hydrogel is preferably from 10 to 70% by weight, more preferably from 20 to 60% by weight, more preferably from 25 to 50% by weight, based on the total weight of the hydrogel.

The hydrogel comprising the cured product of the present invention has high ultraviolet light absorption and transparency, and is useful as a biological hydrogel to provide various molded hydrogel articles for biological use. The hydrogel article for biological use in the present invention refers to articles designed for use in tissues in a living body of mammals, particularly in a living body of humans. Examples of these devices include catheters, implants, stents, and ophthalmic devices such as intraocular lenses and contact lenses.

In the present invention, the "ophthalmic device" means a device to be placed in or on an eye. These devices provide functions such as optical correction, wound care, drug delivery, diagnostic function or improved appearance, or a combination of these functions. The term "lens" includes a variety of soft contact lenses, hard contact lenses, intraocular lenses, overlay lenses, ophthalmic inserts and optical inserts, but not limited to these.

EXAMPLES

The present invention will be explained below in further detail with reference to a series of the Examples and the Comparative Examples. However, the present invention is in no way limited by these Examples.

Synthesis Example 1

Synthesis of an Aqueous Dispersion of Core-Shell Type Metal Oxide Particles (TW-1)

1.8 Grams of tin (IV) chloride pentahydrate (ex. Wako Pure Chemical Industries, Ltd.) was added to 66.0 grams of a 36 wt. % aqueous solution of titanium (IV) chloride (TC-36, ex. Ishihara Sangyo Co., Ltd.) and mixed, and then diluted with 1,000 g of ion-exchanged water. The molar ratio, Ti/Sn, in the aqueous solution containing the metal salts was 24.4. To this aqueous solution containing the metal salts, was added dropwise 300 g of 5 wt. % of aqueous ammonia (ex. Wako Pure Chemical Industries, Ltd.) to cause neutralization and hydrolysis, whereby precipitates of titanium hydroxide containing tin were obtained. The pH of the titanium hydroxide slurry was 8. The obtained precipitates containing titanium hydroxide was repeatedly washed with ion-exchanged water to remove free ions. 100 Grams of a 30 wt. % hydrogen peroxide water (ex. Wako Pure Chemical Industries, Ltd.) was added dropwise to the precipitates, and stirred at 60 degrees C. for 3 hours to allow to react. Thereafter, ion-exchanged water was added to adjust a concentration to thereby obtain a translucent solution of tin-containing peroxotitanic acid with a solid content of 1 wt. %. In a 500 mL-capacity autoclave (TEM-D500, ex. Taiatsu Techno Corporation), 350 mL of the peroxotitanic acid solution obtained above was placed and subjected to hydrothermal treatment at 200 degrees C. and 1.5 MPa for 240 minutes. Then, the reaction mixture in the autoclave was discharged via a sampling tube into a vessel held in a water bath of 25 degrees C. to be rapidly cooled so as to stop the reaction to thereby obtain a titanium oxide/tin oxide complex dispersion (i) (solid content: 1 wt. %).

To a separable flask equipped with a magnetic stirrer and a thermometer, were added 1,000 parts by mass of the titanium oxide/tin oxide complex dispersion (i), 100 parts by mass of ethanol, and 2.0 parts by mass of 5 wt. % of aqueous ammonia at 25 degrees C. and stirred with the magnetic stirrer. The separable flask was immersed in an ice bath and cooled to a content temperature of 5 degrees C. 18 Parts by mass of tetraethoxysilane (KBE-04, ex Shin-Etsu Chemical Co., Ltd.) was added to the mixture, and the separable flask was placed in a µReactorEx (ex. Shikoku Instrumentation CO., LTD.) and the mixture was irradiated with a microwave of a frequency of 2.45 GHz at a power of 1,000 W for 1 minute, while being stirred by the magnetic stirrer. During this time period, it was confirmed that the content temperature reached 85 degrees C. The resulting mixture was filtered through a qualitative filter paper (Advantec 2B) to obtain a low-concentration colloidal solution. The low-concentration colloidal solution was concentrated to a solid content of 10 wt. % by ultrafiltration to obtain an aqueous dispersion of core-shell type metal oxide particles (TW-1). A 50% cumulative particle size of TW-1 in a particle size distribution of the volume basis was 10 nm, as determined by a dynamic light-scattering method with Nanotrack, ex. Nikkiso Co., Ltd. A weight ratio of silicon oxide shell (as $SiO_2$) to the entire core-shell type particle was 18.0 wt. %.

Synthesis Example 2

Synthesis of an Ethanol Dispersion of Core-Shell Type Metal Oxide Particles (TE-1)

To a four-neck 2L separable flask equipped with Jimroth cooling tube, a nitrogen introduction tube, a thermometer and a mechanical stirring blades, were placed 300 g of the aqueous dispersion of core-shell type metal oxide particles (TW-1) which had been diluted by ion-exchange water to a solid content of 1.9 wt. %, and 3 g of a sulfonic acid cationic ion-exchange resin (C150, ex. Purolite) as a catalyst. 225 Grams of methyl trimethoxysilane (KBM-13, ex. Shin-Etsu Chemical Co., Ltd.) was added thereto, and the mixture was stirred at 250 rpm. The dispersion and alkoxysilane reacted with each other by stirring and the mixture became uniform by visual observation. At this time, it was confirmed that the temperature of the dispersion rose from 25 degrees C. to 52 degrees C. After heating and stirring for 2 hours so that the temperature of the dispersion reached 50 degrees C., 750 g of ethanol was added to the dispersion for dilution, while stirring. The diluted dispersion was put into an ultrafilter, so that 800 g of the filtrate was separated. An organic solvent, ethanol, was continuously fed under pressure to the concentrated dispersion, and a filtrate was observed to seep. A receiver (5,000 mL) was placed at a filter outlet, and ethanol was fed under pressure until an amount of the filtrate became 800 g so as to carry out replacement of the dispersion medium. The dispersion was removed from the filtration chamber and treated with molecular sieve 4A (ex. Kanto Chemical Co., Ltd.) to obtain a dispersion of the core-shell type metal oxide particles in ethanol (TE-1). The solid content of TE-1 was 15.1 wt. %, and a water content was 250 ppm by weight. A 50% cumulative particle size in TE-1 in the particle size distribution of the volume basis was 11 nm, as determined by the dynamic light-scattering method with Nanotrack, ex. Nikkiso Co., Ltd.

Synthesis Example 3

Synthesis of an Aqueous Dispersion of Core-Shell Type Metal Oxide Particles (TW-2)

3.3 Grams of a 50 wt. % tin (IV) chloride aqueous solution (ex. Nihon Kagaku Sangyo Co., Ltd.) and 0.1 g of manganese (II) oxide (ex. Kojundo Chemical Laboratory Co., Ltd.) was added to 66.0 grams of a 36 wt. % aqueous solution of titanium (IV) chloride (TC-36, ex. Ishihara Sangyo Co., Ltd.) and mixed, and then diluted with 1,000 g of ion-exchanged water. The molar ratio, Ti/Sn, was 20 and the molar ratio, Ti/Mn, was 100 in the aqueous solution containing the metal salts. To this aqueous solution containing the metal salts, was gradually added 300 g of 5 wt. % of aqueous ammonia (ex. Wako Pure Chemical Industries, Ltd.) for neutralization and hydrolysis, whereby precipitates of titanium hydroxide containing tin and manganese were obtained. A pH of the titanium hydroxide slurry was 8. The obtained precipitates of titanium hydroxide were repeatedly washed with ion-exchanged water and subjected to decantation to remove free ions. 100 Grams of a 30 wt. % aqueous hydrogen peroxide (ex. Wako Pure Chemical Industries, Ltd.) was added gradually to the titanium hydroxide precipitates containing tin and manganese, and stirred at 60 degrees C. for 3 hours to allow to react sufficiently. Thereafter, pure water was added to adjust a concentration to thereby obtain a translucent tin- and manganese-containing peroxotitanic acid solution with a solid content of 1 wt. %. In a 500 mL-capacity autoclave (TEM-D500, ex. Taiatsu Techno Corporation), 350 mL of the peroxotitanic acid solution obtained above was placed and subjected to hydrothermal treatment at 200 degrees C. and 1.5 MPa for 240 minutes. Then, the reaction mixture in the autoclave was discharged via a sampling tube into a vessel held in a water bath of 25 degrees C. to be rapidly cooled so as to stop the reaction to thereby obtain a titanium oxide/tin oxide/manganese oxide complex dispersion.

The obtained titanium oxide/tin oxide/manganese oxide complex dispersion was dried into a powder at 105 degrees C. for 24 hours. The powder was analyzed by a powder X-ray diffractometer (D2 Phaser, ex. Bruker AXS Corporation) to confirm that the crystalline phase was of rutile, i.e., tetragonal.

To a separable flask equipped with a magnetic stirrer and a thermometer, were added 1,000 parts by mass of the titanium oxide/tin oxide/manganese oxide complex dispersion thus obtained, 100 parts by mass of ethanol, and 2.0 parts by mass of ammonia at 25 degrees C. and stirred with the magnetic stirrer. The separable flask was immersed in an ice bath and cooled to a content temperature of 5 degrees C. 18 Parts by mass of tetraethoxysilane (KBE-04, ex Shin-Etsu Chemical Co., Ltd.) were added to the mixture, the separable flask was placed in μReactorEx (ex. Shikoku Instrumentation Co., Ltd.) and the mixture was irradiated with a microwave of a frequency of 2.45 GHz at a power of 1,000 W for 1 minute, while being stirred by the magnetic stirrer. During this time period, it was confirmed that the content temperature reached 85 degrees C. The resulting mixture was filtered through a qualitative filter paper (Advantec 2B) to obtain a low-concentration colloidal solution. The low-concentration colloidal solution was concentrated to a solid content of 8.8 wt. % by ultrafiltration to obtain an aqueous dispersion of core-shell type metal oxide particles (TW-2). A 50% cumulative particle size of TW-2 in a particle size distribution of the volume basis was 17.9 nm, as determined by a dynamic light-scattering method with Nanotrack, ex. Nikkiso Co., Ltd. A weight ratio of silicon oxide (as $SiO_2$) shell to the entire core-shell type particle was 18.0 wt. %.

Synthesis Example 4

Synthesis of an Ethanol Dispersion of Core-Shell Type Metal Oxide Particles (TE-2)

To a four-neck 2L separable flask equipped with a Jimroth cooling tube, a nitrogen gas introduction tube, a thermometer and a mechanical stirring blades, were placed 300 g of the aqueous dispersion of core-shell type metal oxide particles (TW-2) obtained in Synthesis Example 3 (solid content: 8.8 wt. %) and 3 g of a sulfonic acid cationic ion-exchange resin (C150, ex. Purolite) as a catalyst. 225 Grams of methyl trimethoxysilane (KBM-13, ex. Shin-Etsu Chemical Co., Ltd.) were added thereto, and was stirred at 250 rpm. The dispersion and alkoxysilane reacted with each other by stirring and the mixture became uniform by visual observation. At this time, it was confirmed that the temperature of the dispersion rose from 25 degrees C. to 52 degrees C. After heating and stirring for 2 hours so that the temperature of the dispersion reached 50 degrees C., 750 g of ethanol was added to the dispersion for dilution, while stirring. The diluted dispersion was put into an ultrafilter, so that 800 g of the filtrate was separated. Ethanol was continuously fed under pressure to the concentrated dispersion, and a filtrate was observed to seep. A receiver (5,000 mL) was placed at an filter outlet, and ethanol was further fed under pressure until an amount of the filtrate became 800 g. The dispersion was removed from the filtration chamber and treated with molecular sieve 4A (ex. Kanto Chemical Co., Ltd.) to obtain a dispersion of the titanium oxide in ethanol (TE-2). The solid content of TE-2 was 15.1 wt. %, and a water content was 240 ppm by weight. A 50% cumulative particle size of TE-2 in the particle size distribution of the volume basis was 10 nm, as determined by the dynamic light-scattering method with Nanotrack, ex. Nikkiso Co., Ltd.

Example 1

Curing of the Composition and the Preparation of Hydrogel

50 Grams of (A) hydroxymethyl acrylate (HEMA), 0.2 g of (B) ethylene glycol dimethacrylate, and 10 g of (C) the ethanol dispersion TE-1 of the metal oxide particles obtained in Synthetic Example 2 (1.5 g of the solid) were mixed. Subsequently, ethanol contained in TE-1 was removed by distillation at a reduced pressure. To the obtained mixture, was added 0.05 g of (D) Dalocure 1173 (ex. BASF) as a photopolymerization initiator, and the obtained mixture was subjected to bubbling with a nitrogen gas to obtain a photocurable composition from which oxygen was removed.

A Teflon (trade name) tape, as a spacer, was placed on a glass plate coated with a fluorine-coated film to prepare a mold having a base area of 10×10 cm. The photocurable composition was poured into the mold and sandwiched with another glass plate coated with a fluorine-coated film, leaving a space of 0.5 mm. Then, the composition was irradiated with ultraviolet rays at illuminance of 44 mW/cm$^2$ for 5 minutes by an ultraviolet irradiation device (VB-15201BY-A, ex. Ushio Electric Co., Ltd.) to cure. The resulting cured product was immersed in 1 L ion-exchanged water for 60 minutes and, then, taken out of the water and dried at room temperature to obtain transparent hydrogel with a water content of 41 wt. %.

Example 2

The procedures of Example 1 were repeated to obtain a transparent hydrogel, except that 10 g of the dispersion of the metal oxide particles in ethanol, TE-2 (1.5 g of the solid) obtained in Synthetic Example 4 was used as component (C), instead of TE-1.

Comparative Example 1

The procedures of Example 1 were repeated to obtain a hydrogel, except that component (C) was not used.

Comparative Example 2

The procedures of Example 1 were repeated, except that 1.5 g of 2-{3-(2H benzotriazol-2-yl)-4-hydroxyphenyl}ethyl methacrylate (RUVA-93, ex Otsuka Chemical Co., Ltd.) was used instead of TE-1. A substantive amount of the composition remained uncured, and no hydrogel was obtained.

Light transmittance and Ultraviolet curability of each of the hydrogels obtained in the Examples and the Comparative Examples were evaluated according to the following methods. The results are as shown in Table 1.

[Light Transmittance]

Figure 2:
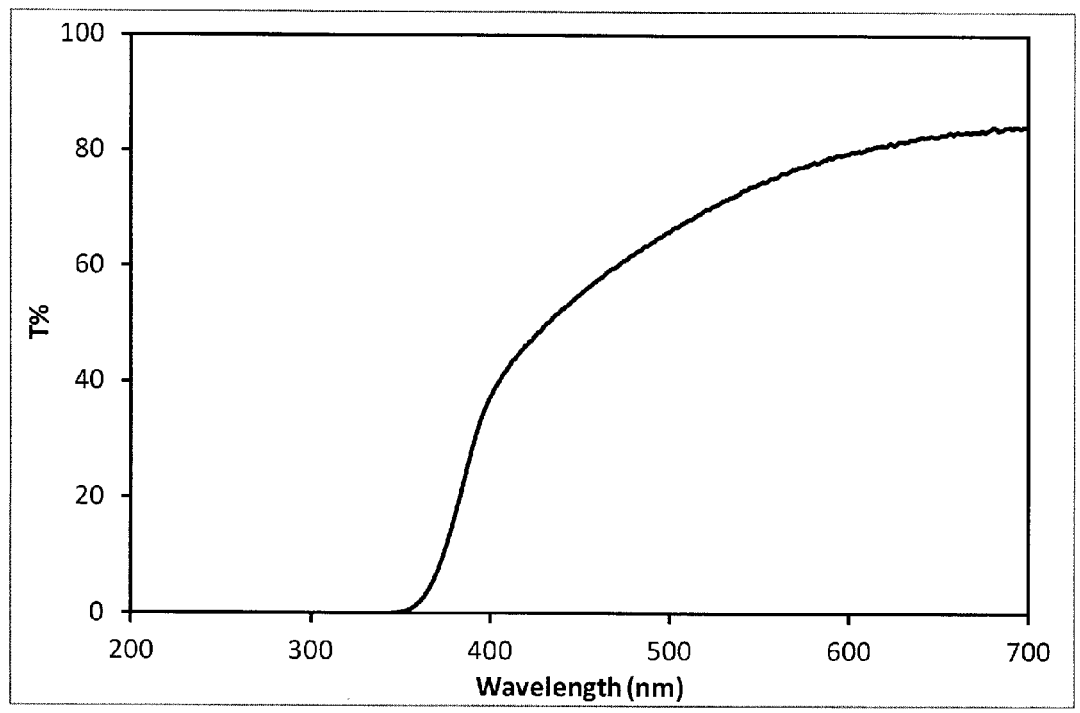
FIG. 2 is a transmitted UV and visible light spectrum of the hydrogel obtained in Example 2.
Figure 3:
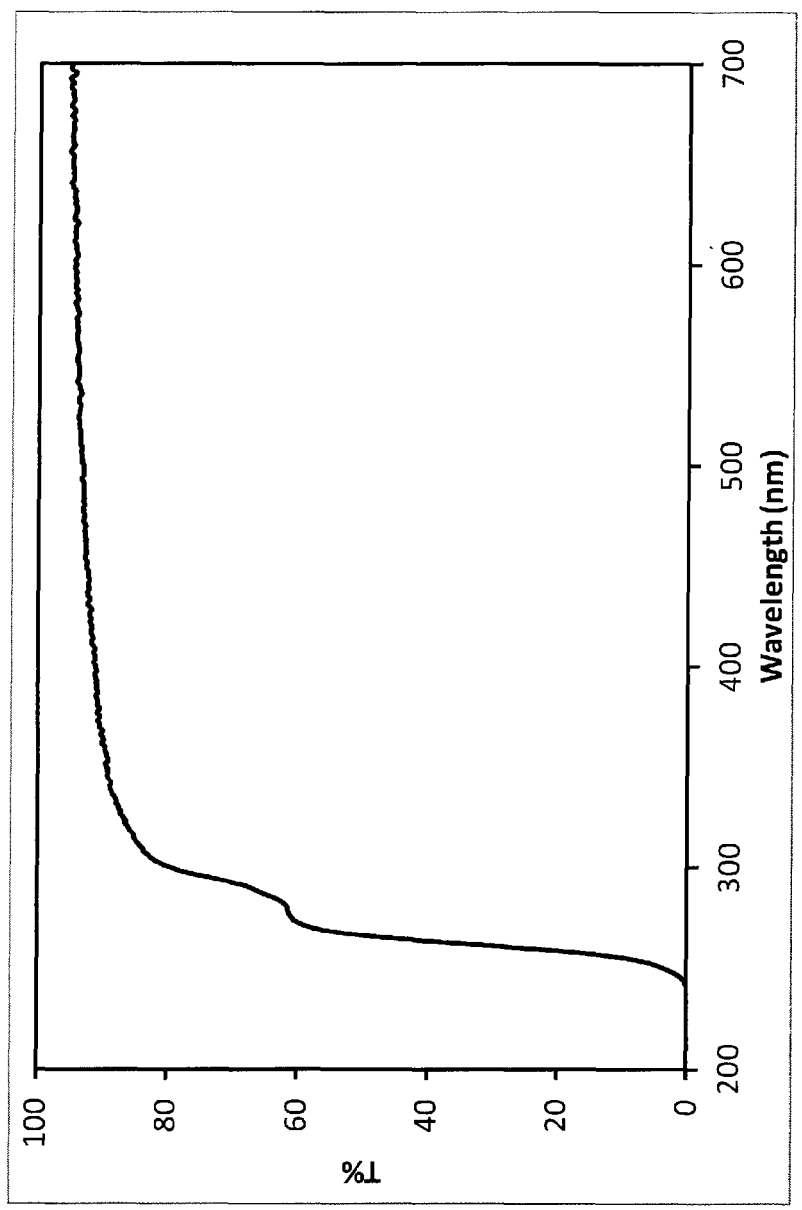
FIG. 3 is a transmitted UV and visible light spectrum of the hydrogel obtained in Comparative Example 1.

UV and visible light spectra transmitted through the hydrogel were observed by a spectrophotometer (U-3900H, ex. Hitachi High-Technology Science Co., Ltd.). The results are as shown in FIGS. 1 to 3.

A visible light transmittance (%) at the wavelength of 600 nm, and ultraviolet transmittances (%) at the wavelengths of 350 nm and 300 nm are described in Table 1. Further, appearance before and after the ultraviolet irradiation was observed to know any discoloration. In Table 1, "G" means that no discoloration was observed, and "B" means that discoloration was observed.

[UV Curability]

Curability in the Examples and the Comparative Example are as shown in Table 1, where "G" means that complete curing occurred, and "B" means that the hydrogel contained an uncured portion.

TABLE 1

|  |  | Example 1 | Example 2 | Com. Ex. 1 | Com. Ex. 2 |
|---|---|---|---|---|---|
| Light transmittance, % | 600 nm | 74 | 81 | 92 | — |
|  | 350 nm | 0 | 0 | 88 | — |
|  | 300 nm | 0 | 0 | 48 | — |
| Discoloration |  | G | G | G | — |
| UV curability |  | G | G | G | B |

The composition of Comparative Example 2 comprising the organic ultraviolet absorber conventionally known as an ultraviolet shielding material showed the poor ultraviolet curability to fail in curing, so that no cured product was obtained.

In contrast, as shown in Examples 1 and 2 in Table 1, the photocurable composition of the present invention showed the good ultraviolet curing properties even though the amount of the photopolymerization catalyst was small, and did not cause change color by irradiation with ultraviolet rays.

Additionally, as seen from the light transmittances in Table 1 and the transmitted UV and visible light spectrum in FIGS. 1 and 2, the hydrogels of the present invention have the superior visible light transmittance and the ultraviolet shielding property.

INDUSTRIAL APPLICABILITY

The photocurable composition of the present invention shows the good ultraviolet curing property, even when the amount of the photopolymerization catalyst is small, and provides a hydrogel having the excellent visible light transmittance and the excellent ultraviolet shielding property. The hydrogel of the present invention is useful as a material for molded hydrogel articles for biological use, such as soft contact lens.

The invention claimed is:

1. A photocurable composition comprising the following components (A) to (D),
   (A) a monomer having one (meth)acryloyl structure,
   (B) a crosslinking agent having two or more (meth) acryloyl structures in an amount of 0.1 to 10 parts by weight, relative to total 100 parts by weight of components (A) and (B),
   (C) an inorganic ultraviolet-blocking agent having a 50% volume cumulative particle size of 1 to 50 nm in the particle size distribution as determined according to a dynamic light scattering method, wherein the inorganic ultraviolet-blocking agent has a core-shell structure composed of a core of a titanium oxide-containing metal oxide and a silicon oxide shell outside the core, in an amount of 0.5 to 10 parts by weight, relative to total 100 parts by weight of components (A) and (B), and
   (D) a photopolymerization initiator in an amount of 0.05 to 1 part by weight, relative to total 100 parts by weight of components (A) and (B),
   wherein a part or all of component (A) is a hydrophilic monomer, and a content of the hydrophilic monomer is 70% by weight or more, relative to the total weight of components (A) and (B).

2. The photocurable composition according to claim 1, wherein the hydrophilic monomer is a compound represented by the following formula (I):

$$CH_2=CR^1COR^2 \tag{I}$$

wherein $R^1$ is a hydrogen atom or a methyl group, $R^2$ is a linear, branched or cyclic alkyl group having 1 to 6 carbon atoms, or a group represented by —OH, —OR$^3$, —NH$^2$, —NHR$^3$ or —NR$^3$R$^4$, and $R^3$ and $R^4$ are, independently of each other, a linear, branched or cyclic alkyl group having 1 to 6 carbon atoms.

3. The photocurable composition according to claim 1, wherein the metal oxide particle includes tetragonal titanium oxide particles which is a solid solution with at least one of tin and manganese, wherein a molar ratio of titanium to tin (Ti/Sn) is 10 to 1,000 and a molar ratio of titanium to manganese (Ti/Mn) is 10 to 1,000.

4. The photocurable composition according to claim 1, wherein at least a part of the surface of the inorganic ultraviolet-blocking agent has a coating layer composed of a surface treatment agent comprising a compound represented by the following general formula (II):

$$R^5Si(OR^6)_3 \tag{II}$$

wherein $R^5$ is a monovalent hydrocarbon group having 1 to 15 carbon atoms and $R^6$ is a linear or branched alkyl group having 1 to 4 carbon atoms, and/or a hydrolysis condensation product thereof.

5. A cured product obtained by curing the photocurable composition according to claim 1.

6. A hydrogel comprising the cured product according to claim 5 and water.

7. A molded product comprising the hydrogel according to claim 6.

8. A photocurable composition comprising the following components (A) to (D), (A) a monomer having one (meth)acryloyl structure,
(B) a crosslinking agent having two or more (meth)acryloyl structures in an amount of 0.1 to 10 parts by weight, relative to total 100 parts by weight of components (A) and (B),
(C) an inorganic ultraviolet-blocking agent having a 50% volume cumulative particle size of 1 to 50 nm in the particle size distribution as determined according to a dynamic light scattering method,
wherein the metal oxide particle includes tetragonal titanium oxide particles which is a solid solution with at least one of tin and manganese, wherein a molar ratio of titanium to tin (Ti/Sn) is 10 to 1,000 and a molar ratio of titanium to manganese (Ti/Mn) is 10 to 1,000,
in an amount of 0.5 to 10 parts by weight, relative to total 100 parts by weight of components (A) and (B),
and
(D) a photopolymerization initiator in an amount of 0.05 to 1 part by weight, relative to total 100 parts by weight of components (A) and (B),
wherein a part or all of component (A) is a hydrophilic monomer, and a content of the hydrophilic monomer is 70% by weight or more, relative to the total weight of components (A) and (B).

9. The photocurable composition according to claim 8, wherein the hydrophilic monomer is a compound represented by the following formula (I):

$$CH_2=CR^1COR^2 \tag{I}$$

wherein $R^1$ is a hydrogen atom or a methyl group, $R^2$ is a linear, branched or cyclic alkyl group having 1 to 6 carbon atoms, or a group represented by —OH, —OR$^3$, —NH$^2$, —NHR$^3$ or —NR$^3$R$^4$, and $R^3$ and $R^4$ are, independently of each other, a linear, branched or cyclic alkyl group having 1 to 6 carbon atoms.

10. The photocurable composition according to claim 8, wherein at least a part of the surface of the inorganic ultraviolet-blocking agent has a coating layer composed of a surface treatment agent comprising a compound represented by the following general formula (II):

$$R^5Si(OR^6)_3 \tag{II}$$

wherein $R^5$ is a monovalent hydrocarbon group having 1 to 15 carbon atoms and $R^6$ is
a linear or branched alkyl group having 1 to 4 carbon atoms, and/or a hydrolysis condensation product thereof.

11. A cured product obtained by curing the photocurable composition according to claim 8.

12. A cured product obtained by curing the photocurable composition according to claim 9.

13. A cured product obtained by curing the photocurable composition according to claim 10.

14. A hydrogel comprising the cured product according to claim 11 and water.

15. A molded product comprising the hydrogel according to claim 12.

* * * * *